United States Patent [19]

Fontaine

[11] 3,860,773
[45] Jan. 14, 1975

[54] COMPOSITE SEAT AND SWITCH WITH RECESSED CONTACTING SHEET

[75] Inventor: John G. Fontaine, Fort Lauderdale, Fla.

[73] Assignee: Safe Stop Brake Corporation, Fort Lauderdale, Fla.

[22] Filed: Mar. 4, 1974

[21] Appl. No.: 447,515

[52] U.S. Cl. .............................. 200/85 A, 340/278
[51] Int. Cl. .......................................... H01h 13/16
[58] Field of Search ............. 200/85 R, 85 A, 86 R; 340/278; 307/105 B

[56] References Cited
UNITED STATES PATENTS
930,761   8/1909   Jacka.............................. 200/85 A FOREIGN PATENTS OR APPLICATIONS
606,742   3/1926   France................................ 340/278

Primary Examiner—David Smith, Jr.
Attorney, Agent, or Firm—Oltman and Flynn

[57] ABSTRACT

A composite seat and switch wherein a base panel, a resilient pad, a pair of contacting sheets and a seat cover are integrated together with one of the contacting sheets in a recess in either the pad or the panel and between the same so as to be separated from the other contacting sheet. The contacting sheets close when a person sits on the seat cover and open when the person leaves the same as a result of the resilient action of the pad.

8 Claims, 9 Drawing Figures

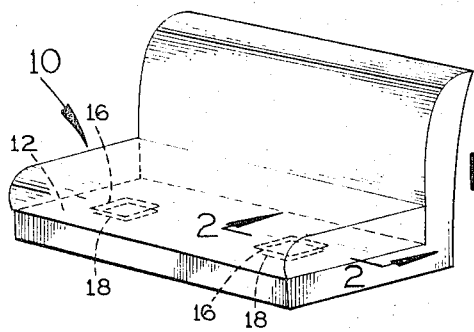
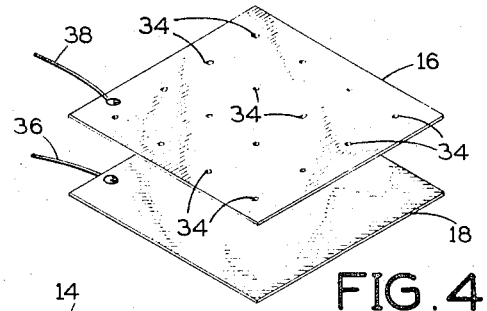
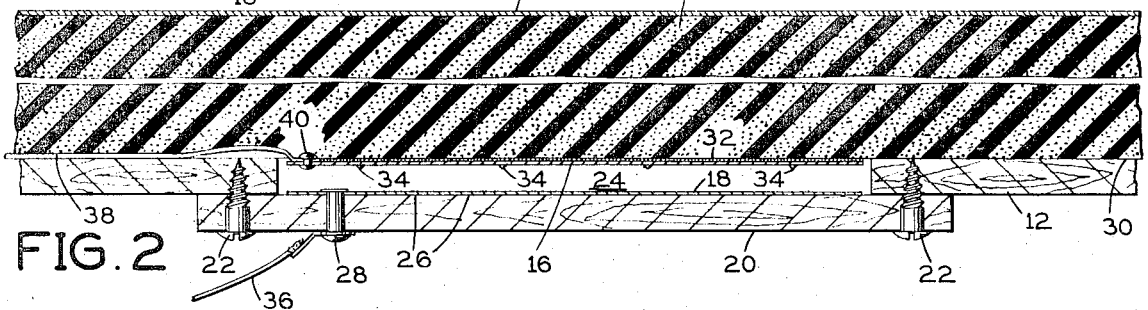
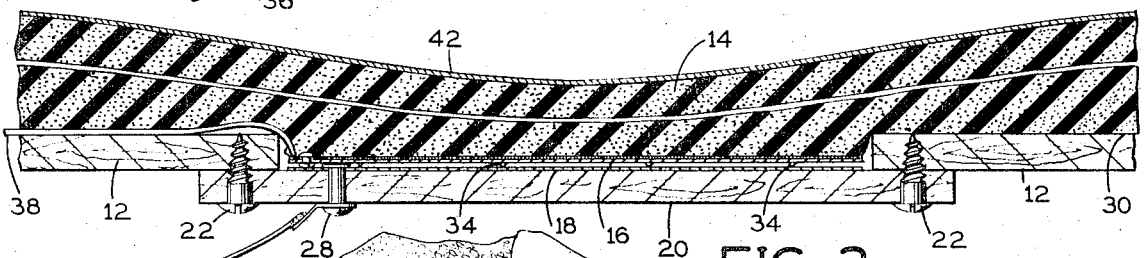
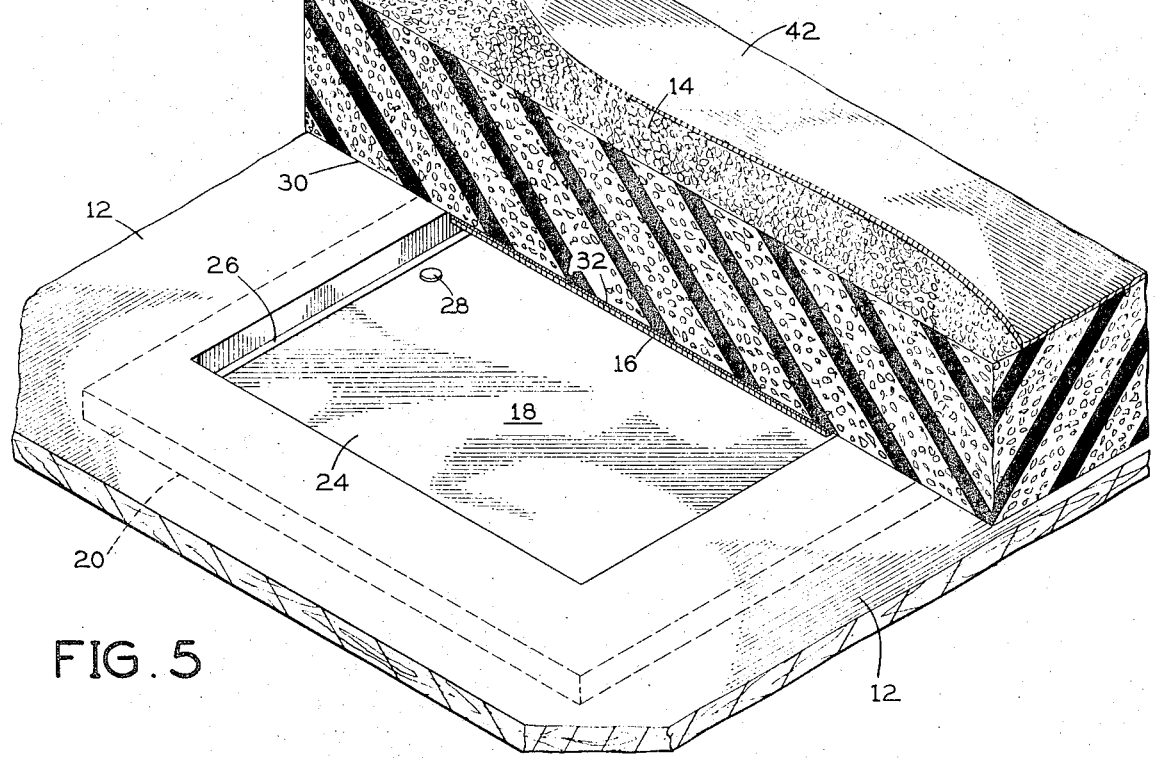

COMPOSITE SEAT AND SWITCH WITH RECESSED CONTACTING SHEET

RELATED PATENTS

This application is related to U.S. Pat. Nos. 3,704,352 and 3,487,451 both issued to the present inventor.

BACKGROUND OF THE INVENTION

In U.S. Pat. No. 3,487,451, a switch was provided in a seat for controlling the brakes of an automotive vehicle. In practice, the switch was mounted on a base panel which was typically mounted on a spring biased post. The switch had an envelope which was tacked to the panel. It has been proposed that the switch may be mounted on a base panel overlying coil springs.

U.S. Pat. No. 3,704,352 described and claimed a composite seat and switch incorporating elements of a seat of an automotive vehicle and including sheets having electrical contacts which make and break through openings in a resilient, compressible, insulating separator, the sheets and separator cooperating with a seat padding layer, springs and a seat cover. The parts were integrated together into a composite seat and switch.

SUMMARY OF THE INVENTION

The present invention provides a composite seat and switch which is particularly adapted for installations in which a resilient seat pad is directly mounted on a base panel.

In a preferred embodiment, a pair of contacting sheets are affixed respectively to the resilient pad and the base panel in opposed, spaced and parallel relation with each other. Either the panel or the pad has a recessed mounting surface receiving one of the contacting sheets, and that contacting sheet is affixed to the recessed mountings surface so as to be separated from the other contacting sheet. A seat cover covers the pad, base and contacting sheets. Contact areas on the sheets close when a person sits on the seat cover and open when the person leaves the same as a result of the resilient action of the pad.

BRIEF DESCRIPTION OF THE DRAWINGS

FIG. 1 is a schematic perspective view of a composite seat and switch in accordance with one embodiment of the invention;

FIG. 2 is a fragmentary sectional view taken along line 2—2 of FIG. 1;

FIG. 3 is a fragmentary sectional view similar to FIG. 2 but showing the condition of the structure when a person sits on the seat and switch;

FIG. 4 is a perspective view of a pair of contacting sheets included in FIGS. 1–3;

FIG. 5 is a perspective view, partly cut away, which reveals the manner in which the contacting sheets are mounted with one contacting sheet in a recess and spaced by air from the other contacting sheet;

Figure 6:
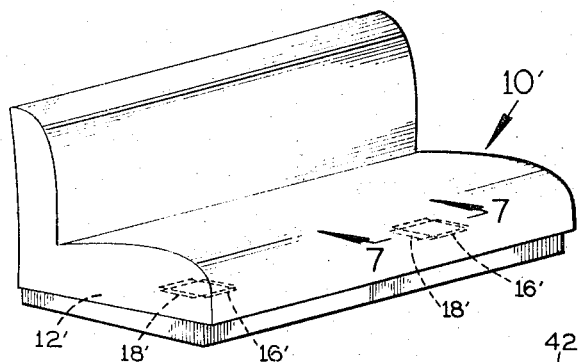
FIG. 6 is a schematic perspective view of a composite seat and switch in accordance with another embodiment of the invention.
Figure 7:
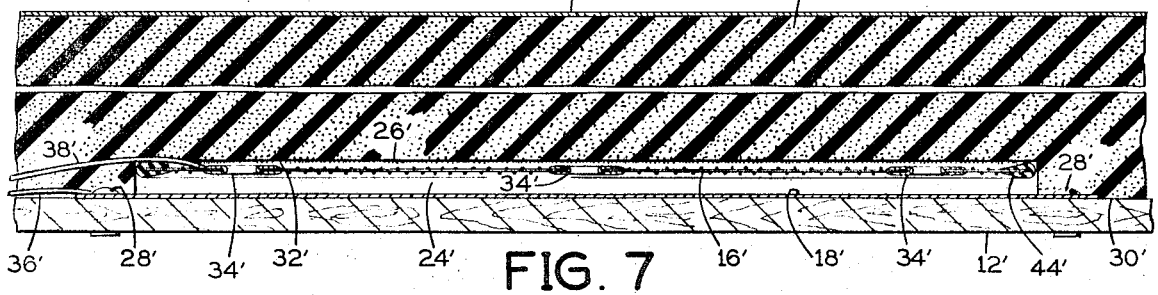
FIG. 7 is a fragmentary sectional view taken along lines 7—7 of FIG. 6.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phrase-ology or terminology employed herein is for the purpose of description and not of limitation.

DETAILED DESCRIPTION

Referring first to FIGS. 1 through 5, the composite seat and switch 10 includes an insulating base panel 12 (usually wooden) which is mounted above a floor. Typically, the composite seat and switch 10 is mounted in an automotive vehicle and is used to control some function of the vehicle such as the brakes, seat belts, headlights, windshield wipers, or any other desired function. Ordinarily, the base panel 12 is mounted horizontally above the floor of the vehicle although it could be mounted in some other position such as a vertical position for the back of the seat.

Mounted directly on the base panel 12 is a resilient insulating pad 14 providing the seat cushion of the seat and switch structure. The pad 14 is shown broken in FIGS. 2 and 3 since its thickness is not to scale. Ordinarily, the pad 14 is a resilient foam material.

A pair of contacting sheets 16 and 18 are mounted between the pad 14 and the base panel 12. In this embodiment, the base panel 12 has a portion or section 20 which is removably affixed as with screws 22 to the remainder of the base panel. Panel section 20 overlaps the remainder of the base panel and is mounted underneath the remainder of the base panel so as to provide a recess 24 having a mounting surface 26 at the base thereof. The mounting surface 26 in this embodiment is the upper surface of the panel section 20. The contacting sheet 18 is affixed directly to the mounting surface 26 at the bottom of the recess 24 as with rivets 28. The other contacting sheet 16 is affixed directly to the bottom surface 30 of the pad 14 by cement 32. Thus, the contacting sheets 16 and 18 are mounted in spaced, opposed, parallel relation with each other. They are separated from each other only by air in the space 24. The contacting sheets have conductive areas which close in the manner shown in FIG. 3 when a person sits on the seat and switch. In the embodiment illustrated in FIGS. 1–5, the lower contacting sheet 18 is entirely made of conductive material, and the upper contacting sheet 16 is also entirely made of conductive material and has a plurality of conductive contact areas in the form of dimples 34. When a person sits on the seat as illustrated in FIG. 3, the dimples 34 touch the lower contacting sheet 18 to electrically close the contacting sheets. Electrical connections are made to the contacting sheets as with wires 36 and 38. Wire 36 may be connected to the rivet 28, and wire 38 may be connected to a rivet 40 on the contacting sheet 18.

A seat cover 42 covers the pad 14, the panel 12 and the contacting sheets 16 and 18. Since all of the parts are integrated together, the structure is a composite seat and switch in which the contacting sheets close when a person sits on the seat cover and open when a person leaves the seat cover.

It may be noted that the contacting sheets need not be entirely made of conductive material. The sheets may be made of plastic having conductive areas affixed thereto. Other variations are possible. For example, an apertured, resilient, compressible insulating separator could be located between the contacting sheets as in U.S. Pat. No. 3,704,352, but it is believed to be simpler to eliminate such a separator.

FIGS. 6 through 9 inclusive illustrate another embodiment of the invention. In this embodiment, the same reference numerals are used to designate like parts except that a prime designation has been added to distinguish this embodiment from the embodiment of FIGS. 1 through 5.

In FIGS. 6 through 9, it may be seen that the space 24' is formed by recessing the bottom of the pad 14' upwardly. The mounting surface 26' is a horizontal surface of the pad located at the base of this recess. The panel 12' is one piece. The contacting sheet 18' is made entirely of conductive material and may essentially be a square or rectangle of metal. The other contacting sheet 16' is made primarily of wire mesh and has electrical contacts 34' in the form of small rivets. Binding material 44' binds the edge of the sheet 16' and serves as an insulator. The contacting sheet 16' is affixed to the recessed mounting surface 26' with cement 32' so as to be separated only by air from the other contacting sheet 18'. In all other respects, the embodiment of FIGS. 6 through 9 is substantially identical to the embodment of FIGS. 1 through 5.

Figure 8:
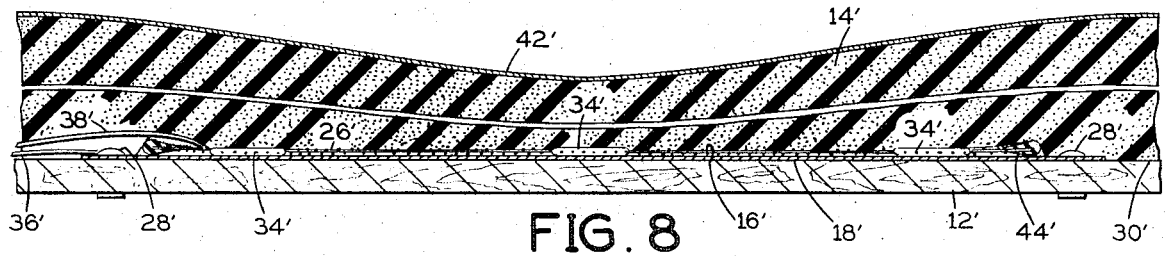
FIG. 8 is a fragmentary sectional view similar to FIG. 7, but showing the condition of the structure when a person sits on the seat and switch.
Figure 9:
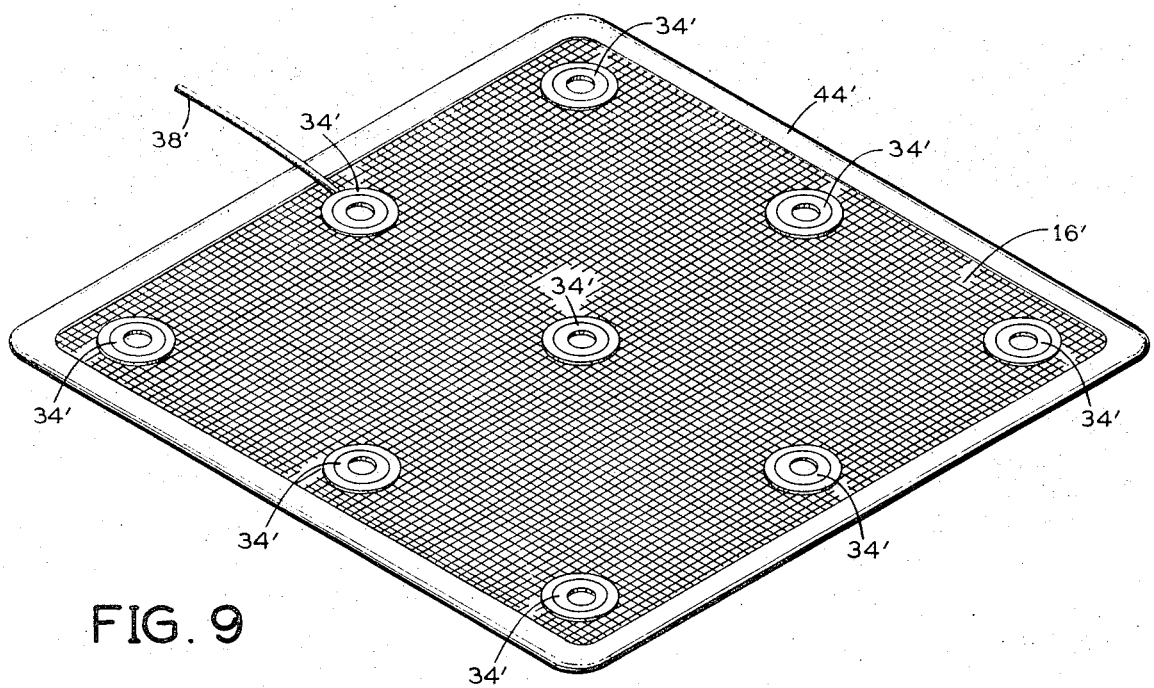
FIG. 9 is a perspective view of one of the contacting sheets included in FIGS. 6–8.

When a person sits on the composite seat and switch 10' of FIGS. 6 through 9, the resilient pad 14' compresses as shown in FIG. 8, and the contacts 34' touch the contacting sheet 18' to electrically close the contacts. When the person leaves the seat and switch, the contacts open. The opening and closing action of the contacts is a result of the resilient action of the pad 14'.

As shown in FIGS. 1 and 6 there may be more than one pair of contacting sheets in a given composite seat and switch. The contacting sheets occupy an extended area on which a person normally sits. Since the contacts are spread over this extended area, at least one contact will ordinarily remain closed when a person is sitting on the switch even if the person should lean over or move around on the seat. The lower contacting sheets 18' could be combined into a single long sheet in FIG. 6.

The embodiment of FIGS. 1 through 5 has the advantage that the panel section 20 can be removed by removing the screws 22 to provide access to the contacting sheets for repair or maintenance purposes. Where this access is not desired, the embodiment of FIGS. 6 through 9 is suitable. Both embodiments require very few parts, and assembly of the components requires relatively little labor.

Having thus described my invention, I claim:

1. In a composite seat and switch including a base, a resilient pad covering said base, a pair of contacting sheets mounted between said pad and said base and having contacts spread over the area thereof adapted to close when a person sits on the seat and switch, and a seat cover covering said pad, base and contacting sheets, the improvement wherein said base constitutes a relatively rigid panel, said contacting sheets are affixed respectively to said pad and said panel in opposed, spaced and parallel relation with each other, one of said panel and said pad has a recessed surface receiving one of said contacting sheets, and said one contacting sheet is affixed to said recessed surface so as to be separated only by air from the other contacting sheet, whereby said base, pad, sheets and seat cover are integrated into a composite seat and switch in whch said contacts close when a person sits on said seat cover and opens when the person leaves the same as a result of the resilient action of said pad.

2. The composite seat and switch as claimed in claim 1 in which said recessed surface is a surface of said pad.

3. The composite seat and switch as claimed in claim 2 in which said one contacting sheet is affixed to said recessed surface by cement.

4. The composite seat and switch as claimed in claim 1 in which said recessed surface is a surface of said panel.

5. The composite seat and switch as claimed in claim 4 in which said recessed surface is located on a portion of said panel which is removably affixed to the remainder thereof so that said panel portion can be removed to provide access to said contacting sheets.

6. The composite seat and switch as claimed in claim 5 in which said other contacting sheet is affixed to said pad by cement.

7. In a composite seat and switch including a base panel, a resilient pad mounted on said base panel providing a seat cushion, a pair of contacting sheets between said pad and said panel and adapted to close electrically when a person sits on the seat and switch, and a seat cover covering said pad, base and contacting sheets, the improvement wherein, one of said panel and said pad has a recess therein with a mounting surface at the base of said recess, said contacting sheets are affixed respectively to said pad and said panel in opposed, spaced and parallel relation with each other, and one of said contacting sheets is affixed to said recessed mounting surface and is separated from the other contacting sheet, said contacting sheets having conducting areas which close when a person sits on said seat cover and open when the person leaves the same.

8. In a composite seat and switch including a base, a resilient pad mounted on said base providing a seat cushion, a pair of contacting sheets between said pad and base, and a seat cover covering said pad, base and contacting sheets, the improvement wherein, said base comprises a rigid panel, one of said pad and said panel has means forming a recess therein, with a space in said recess, said contacting sheets are located at said recess between said pad and panel in opposed, separated and parallel relation with each other, and said contacting sheets extend over an area occupied by a seated person and have a plurality of conductive contacts spread over said area which close when a person sits on said seat cover at said area and open when the person leaves the same.

* * * * *